(12) United States Patent
Russinovich et al.

(10) Patent No.: US 10,764,259 B2
(45) Date of Patent: Sep. 1, 2020

(54) TRANSACTION PROCESSING FOR CONSORTIUM BLOCKCHAIN NETWORK

(71) Applicant: Microsoft Technology Licensing, LLC, Redmond, WA (US)

(72) Inventors: Mark Russinovich, Hunts Point, WA (US); Manuel Costa, Cambridge (GB); Matthew Kerner, Seattle, WA (US); Thomas Moscibroda, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 120 days.

(21) Appl. No.: 15/638,213

(22) Filed: Jun. 29, 2017

(65) Prior Publication Data
US 2018/0225448 A1    Aug. 9, 2018

Related U.S. Application Data

(60) Provisional application No. 62/455,981, filed on Feb. 7, 2017.

(51) Int. Cl.
*H04L 29/06* (2006.01)
*H04L 9/32* (2006.01)
(Continued)

(52) U.S. Cl.
CPC .......... *H04L 63/0435* (2013.01); *G06F 21/53* (2013.01); *G06F 21/57* (2013.01);
(Continued)

(58) Field of Classification Search
CPC . H04L 63/0435; H04L 9/0637; H04L 9/3236; H04L 9/3265; H04L 63/062;
(Continued)

(56) References Cited

U.S. PATENT DOCUMENTS 8,458,462 B1    6/2013  Hanna
2015/0278820 A1  10/2015  Meadows
(Continued)

FOREIGN PATENT DOCUMENTS

CN        107145768    †  3/2016
CN        105488665 A      4/2016
(Continued)

OTHER PUBLICATIONS

Greenspan, Gideon., "MultiChain Private Blockchain—White Paper", Retrieved from http://web.archive.org/web/20161201162629/http://www.multichain.com/download/MultiChain-White-Paper.pdf, Mar. 17, 2017, 17 Pages.

(Continued)

*Primary Examiner* — Oleg Korsak
(74) *Attorney, Agent, or Firm* — Davin Chin; Chin IP, PLLC

(57) ABSTRACT

The disclosed technology is generally directed to blockchain and other security technology. In one example of the technology, a pre-determined type of blockchain or other security protocol code is stored in a trusted execution environment (TEE) of the processor. TEE attestation is used to verify that the blockchain or other security protocol code stored in the TEE is the pre-determined type of blockchain or other security protocol code. A blockchain or other transaction is received and processed. Based on the processing of the transaction, an official state of the transaction on a consortium network is directly updated for the network. The updated official state of the processed transaction is broadcasted to the consortium network.

20 Claims, 11 Drawing Sheets

(51) Int. Cl.

| | |
|---|---|
| *G06F 21/57* | (2013.01) |
| *G06Q 20/00* | (2012.01) |
| *G06F 21/74* | (2013.01) |
| *G06Q 20/02* | (2012.01) |
| *G06F 21/53* | (2013.01) |
| *G06Q 20/06* | (2012.01) |
| *G06Q 20/38* | (2012.01) |
| *G11B 20/00* | (2006.01) |
| *H04L 9/06* | (2006.01) |
| *H04L 9/08* | (2006.01) |

(52) U.S. Cl.
CPC ............. *G06F 21/74* (2013.01); *G06Q 20/00* (2013.01); *G06Q 20/02* (2013.01); *G06Q 20/065* (2013.01); *G06Q 20/3829* (2013.01); *G11B 20/00282* (2013.01); *H04L 9/0637* (2013.01); *H04L 9/3236* (2013.01); *H04L 9/3265* (2013.01); *H04L 63/062* (2013.01); *H04L 63/065* (2013.01); *H04L 63/08* (2013.01); *H04L 63/10* (2013.01); *H04L 63/101* (2013.01); *H04L 63/104* (2013.01); *H04L 63/12* (2013.01); *H04L 63/123* (2013.01); *H04L 9/0833* (2013.01); *H04L 9/3242* (2013.01); *H04L 9/3255* (2013.01); *H04L 2209/127* (2013.01); *H04L 2209/38* (2013.01)

(58) Field of Classification Search
CPC ....... H04L 63/065; H04L 63/08; H04L 63/10; H04L 63/101; H04L 63/104; H04L 63/12; H04L 63/123; G06F 21/53; G06F 21/57; G06F 21/74; G06Q 20/3829; G06Q 20/00; G06Q 20/02; G06Q 20/065; G11B 20/00282
See application file for complete search history.

(56) References Cited

U.S. PATENT DOCUMENTS

| | | | |
|---|---|---|---|
| 2016/0098723 A1 | 4/2016 | Feeney | |
| 2016/0260169 A1 | 9/2016 | Arnold et al. | |
| 2016/0275461 A1† | 9/2016 | Sprague et al. | |
| 2016/0283920 A1 | 9/2016 | Fisher et al. | |
| 2016/0300234 A1 | 10/2016 | Moss-pultz et al. | |
| 2017/0005804 A1 | 1/2017 | Zinder | |
| 2017/0033932 A1 | 2/2017 | Truu et al. | |
| 2017/0046698 A1 | 2/2017 | Haldenby et al. | |
| 2017/0048217 A1 | 2/2017 | Biggs et al. | |
| 2017/0243212 A1 | 8/2017 | Castinado et al. | |
| 2017/0243215 A1 | 8/2017 | Sifford et al. | |
| 2017/0278186 A1 | 9/2017 | Creighton et al. | |
| 2017/0366348 A1 | 12/2017 | Weimer et al. | |
| 2018/0041345 A1 | 2/2018 | Maim | |
| 2018/0097635 A1 | 4/2018 | Moses | |
| 2018/0145836 A1 | 5/2018 | Saur et al. | |
| 2018/0374173 A1* | 12/2018 | Chen .................. | G06F 21/10 |
| 2019/0036682 A1 | 1/2019 | Qiu | |
| 2019/0349733 A1 | 11/2019 | Nolan et al. | |
| 2020/0084189 A1 | 3/2020 | Russinovich et al. | |

FOREIGN PATENT DOCUMENTS

| | | |
|---|---|---|
| CN | 105488675 A | 4/2016 |
| EP | 3010205 A1 | 4/2016 |

OTHER PUBLICATIONS

"The Coco Framework Technical Overview", Retrieved from https://github.com/Azure/coco-framework/blob/master/docs/Coco%20Framework%20whitepaper.pdf, Aug. 10, 2017, 20 Pages.

Hardjono, Thomas., "Anonymous Identities for Permissioned Blockchains", Retrieved from http://www.the-blockchain.com/docs/MIT-ChainAnchor-DRAFT.pdf, Feb. 14, 2018, 16 Pages.

Liu, et al., "Scalable Byzantine Consensus via Hardware-assisted Secret Sharing", In ARXIV.org, Cornell University Library, Dec. 15, 2016, 11 Pages.

Ongaro, et al., "In Search of an Understandable Consensus Algorithm (Extended Version)", Retrieved from https://raft.github.io/raft.pdf, May 20, 2014, 18 Pages.

"International Search Report Issued in PCT Application No. PCT/US18/016056", dated Apr. 26, 2018, 12 Pages.

"International Search Report Issued in PCT Application No. PCT/US18/016057", dated Apr. 30, 2018, 12 Pages.

"International Search Report Issued in PCT Application No. PCT/US18/016058", dated Apr. 26, 2018, 11 Pages.

Lind, et al., "Teechan: Payment Channels Using Trusted Execution Environments", In Journal of Computing Research Repository, Dec. 2016, pp. 1-14.

Dinh, et al., "Blockbench: A Framework for Analyzing Private Blockchains", https://airxiv.org/pdf/1703.04057.pdf, Published on: Mar. 2017, 16 pages.

"Hyperledger whitepaper", http://web.archive.org/web/20160804183326/http:/www.the-blockchain.com/docs/Hyperledger%20Whitepaper.pdf, Published on: Aug. 4, 2016, 20 pages.

"Consortiums and Shared Ledgers: Supply Chains as a Use Case", http://sammantics.com/, Published on: Dec. 28, 2016, 34 pages.

Cachin, Christian, "Architecture of the Hyperledger Blockchain Fabric", In Proceedings of Workshop on Distributed Cryptocurrencies and Consensus Ledgers, Jul. 2016, 4 pages.

Cachin, Christian, "Blockchain, cryptography, and consensus", In Proceedings of ITU Workshop on "Security Aspects of Blockchain", Mar. 21, 2017, 38 pages.

Chan, Ronald, "Consensus Mechanisms used in Blockchain", https://www.linkedin.com/pulse/consensus-mechanisms-used-blockchain-ronald-chan, Published on: May 2, 2016, 6 pages.

Edwards, Dana, "Ethereum, Bitcoin, DDOS/DOS and CAP theorem", https://steemit.com/ethereum/@dana-edwards/ethereum-bitcoin-ddos-dos-and-cap-theorem, Retrieved on: Mar. 30, 2017, 9 pages.

Gandhi, R., "Applications of Blockchain Technology to Banking and Financial Sector in India", In White Paper of IDRBT, Jan. 2017, 36 pages.

Gramoli, Vincent, "On the Danger of Private Blockchains", In Proceedings of Workshop on Distributed Cryptocurrencies and Consensus Ledgers, Jul. 25, 2016, pp. 1-4.

Hardjono, et al., "Cloud-Based Commissioning of Constrained Devices using Permissioned Blockchains", In Proceedings of the 2nd ACM International Workshop on IoT Privacy, Trust, and Security, May 30, 2016, pp. 29-36.

Lind, et al., "Teechan: Payment Channels Using Trusted Execution Environments", In Proceedings of the Computing Research Repository, Dec. 2016, pp. 1-14.

Milutinovic, et al., "Proof of Luck: an Efficient Blockchain Consensus Protocol", In Proceedings of the 1st Workshop on System Software for Trusted Execution, Dec. 12, 2016, 50 pages.

Milutinovic, et al., "Proof of Luck: an Efficient Blockchain Consensus Protocol", In Proceedings of the 1st Workshop on System Software for Trusted Execution, Dec. 12, 2016, 6 pages.

Russinovich, Mark et al.; "Consortium Blockchain Network With Verified Blockchain and Consensus Protocols"; U.S. Appl. No. 15/638,203, filed Jun. 29, 2017; 57 pages.

Russinovich, Mark et al.; "Establishment of Consortium Blockchain Network"; U.S. Appl. No. 15/638,180, filed Jun. 29, 2017; 56 pages.

"Notice of Allowance Issued in U.S. Appl. No. 15/638,180", dated Feb. 26, 2019, 10 Pages.

"Non-final Office Action Issued in U.S. Appl. No. 15/638,203", dated Jan. 7, 2019, 19 Pages.

Xu, et al., "The Blockchain as a Software Connector", In Proceedings of the 13th Working IEEE/IFIP Conference on Software Architecture, Apr. 5, 2016, 10 Pages.

"Final Office Action Issued in U.S. Appl. No. 15/638,203", dated Jun. 7, 2019, 19 Pages.

"Non Final Office Action Issued in U.S. Appl. No. 15/638,203", dated Dec. 20, 2019, 23 Pages.

(56) References Cited

OTHER PUBLICATIONS

"Final Office Action Issued in U.S. Appl. No. 15/638,203", dated Jun. 4, 2020, 28 Pages.

\* cited by examiner
† cited by third party

TRANSACTION PROCESSING FOR CONSORTIUM BLOCKCHAIN NETWORK

CROSS-REFERENCE TO RELATED APPLICATION(S)

This application claims the benefit of U.S. Provisional Application No. 62/455,981, filed Feb. 7, 2017. The entirety of this afore-mentioned application is incorporated herein by reference.

BACKGROUND

Blockchain systems have been proposed for a variety of application scenarios, including applications in the financial industry, health care, IoT, and so forth. For example, the Bitcoin system was developed to allow electronic cash to be transferred directly from one party to another without going through a financial institution. A bitcoin (e.g., an electronic coin) is represented by a chain of transactions that transfers ownership from one party to another party. To transfer ownership of a bitcoin, a new transaction may be generated and added to a stack of transactions in a block. The new transaction, which includes the public key of the new owner, may be digitally signed by the owner with the owner's private key to transfer ownership to the new owner as represented by the new owner public key.

Once the block is full, the block may be "capped" with a block header that is a hash digest of all the transaction identifiers within the block. The block header may be recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain may create a mathematical proof of ownership in an entity represented by a security identity (e.g., a public key), which in the case of the bitcoin system is pseudo-anonymous.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to blockchain and other security technology. In one example of the technology, a pre-determined type of blockchain or other security protocol code is stored in a trusted execution environment (TEE) of the processor. TEE attestation is used to verify that the blockchain or other security protocol code stored in the TEE is the pre-determined type of blockchain or other security protocol code. A blockchain or other transaction is received and processed. Based on the processing of the transaction, an official state of the transaction on a consortium network is directly updated for the network. The updated official state of the processed transaction is broadcasted to the consortium network.

In some examples, a participant of a blockchain network may submit a transaction to the blockchain network that is encrypted by a blockchain master key. The transaction may be forwarded to a particular validation node (VN) in the blockchain network that is selected based on a conflict resolution protocol, consensus protocol, and/or the like. The selected VN may then process the reaction by executing the code of the transaction, and may then resolve any conflicts. The VN may then directly update the official state of the processed blockchain based on the processing of the blockchain transaction. "Directly" updating the state means that the VN updates the state without any actions or confirmation being required by any other entity in order to update the state. The VN may then broadcast the updated official state of the processed blockchain to the blockchain network. In some examples, because of the trust, VNs do not need to do re-computation for verification. Rather, in some examples, the entire network accepts the transactions, including chaincode transactions, and blockchain states are directly updated. In some examples, there is no need for a copy of the transaction in order to confirm a block.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
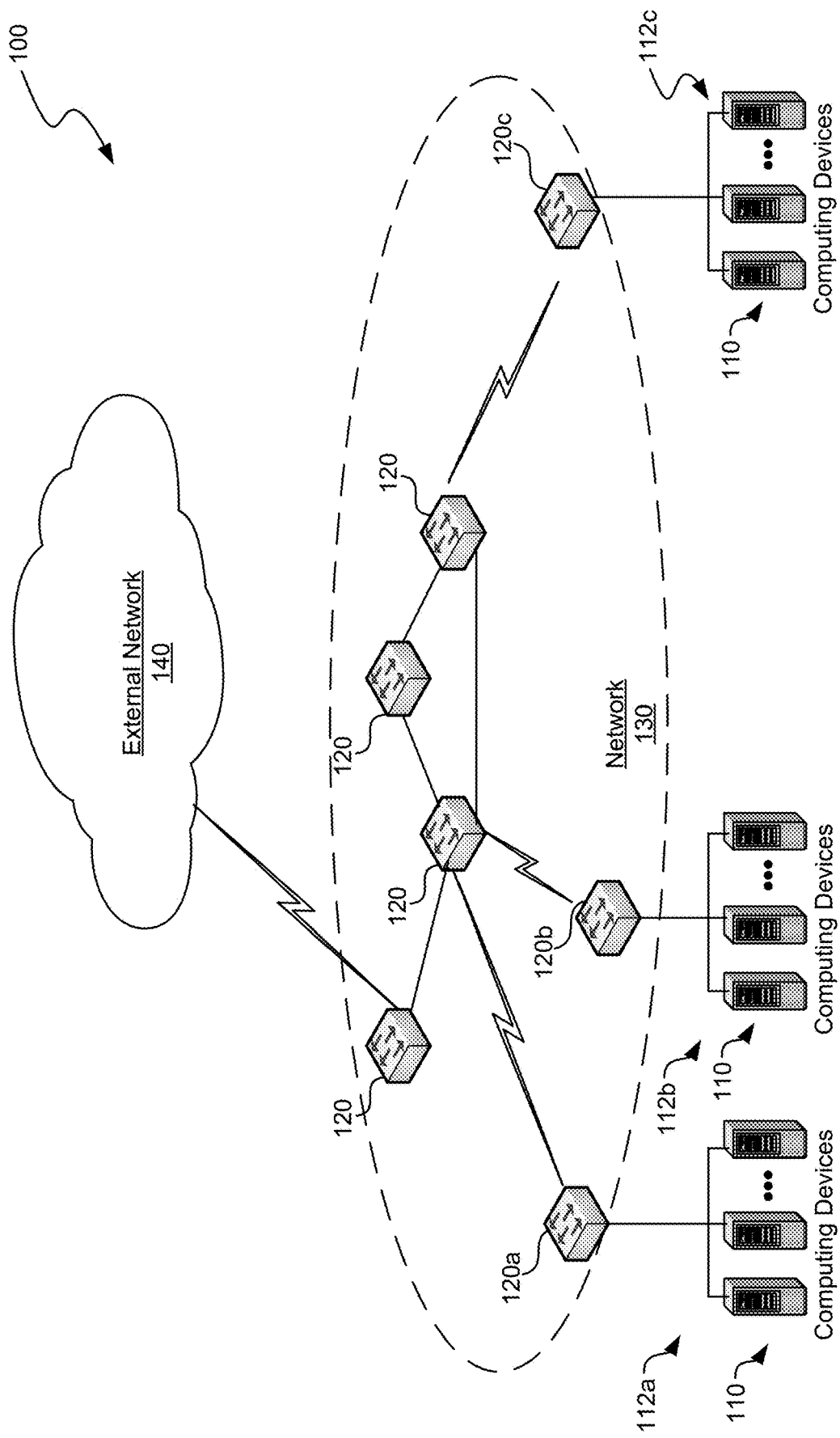
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to blockchain and other security technology. In one example of the technology, a pre-determined type of blockchain or other security protocol code is stored in a trusted execution environment (TEE) of the processor. TEE attestation is used to verify that the blockchain or other security protocol code stored in the TEE is the pre-determined type of blockchain or other security protocol code. A blockchain or other transaction is received and processed. Based on the processing of the transaction, an official state of the transaction on a consortium network is directly updated for the network. The updated official state of the processed transaction is broadcasted to the consortium network.

In some examples, a participant of a blockchain network may submit a transaction to the blockchain network that is encrypted by a blockchain master key. The transaction may be forwarded to a particular validation node (VN) in the blockchain network that is selected based on a conflict resolution protocol, consensus protocol, and/or the like. The selected VN may then process the reaction by executing the code of the transaction, and may then resolve any conflicts. The VN may then directly update the official state of the processed blockchain based on the processing of the blockchain transaction. The VN may then broadcast the updated official state of the processed blockchain to the blockchain network. In some examples, because of the trust, VNs do not need to do re-computation for verification. Rather, in some examples, the entire network accepts the transactions, including chaincode transactions, and blockchain states are directly updated. In some examples, there is no need for a copy of the transaction in order to confirm a block.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices no shown in FIG. 1 may be in various locations, including on premise, in the cloud, or the like. For example, computer devices no may be on the client side, on the server side, or the like.

As shown in FIG. 1, network 130 can include one or more network nodes 120 that interconnect multiple computing devices no, and connect computing devices no to external network 140, e.g., the Internet or an intranet. For example, network nodes 120 may include switches, routers, hubs, network controllers, or other network elements. In certain examples, computing devices no can be organized into racks, action zones, groups, sets, or other suitable divisions. For example, in the illustrated example, computing devices no are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices no and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Illustrative Computing Device

Figure 2:
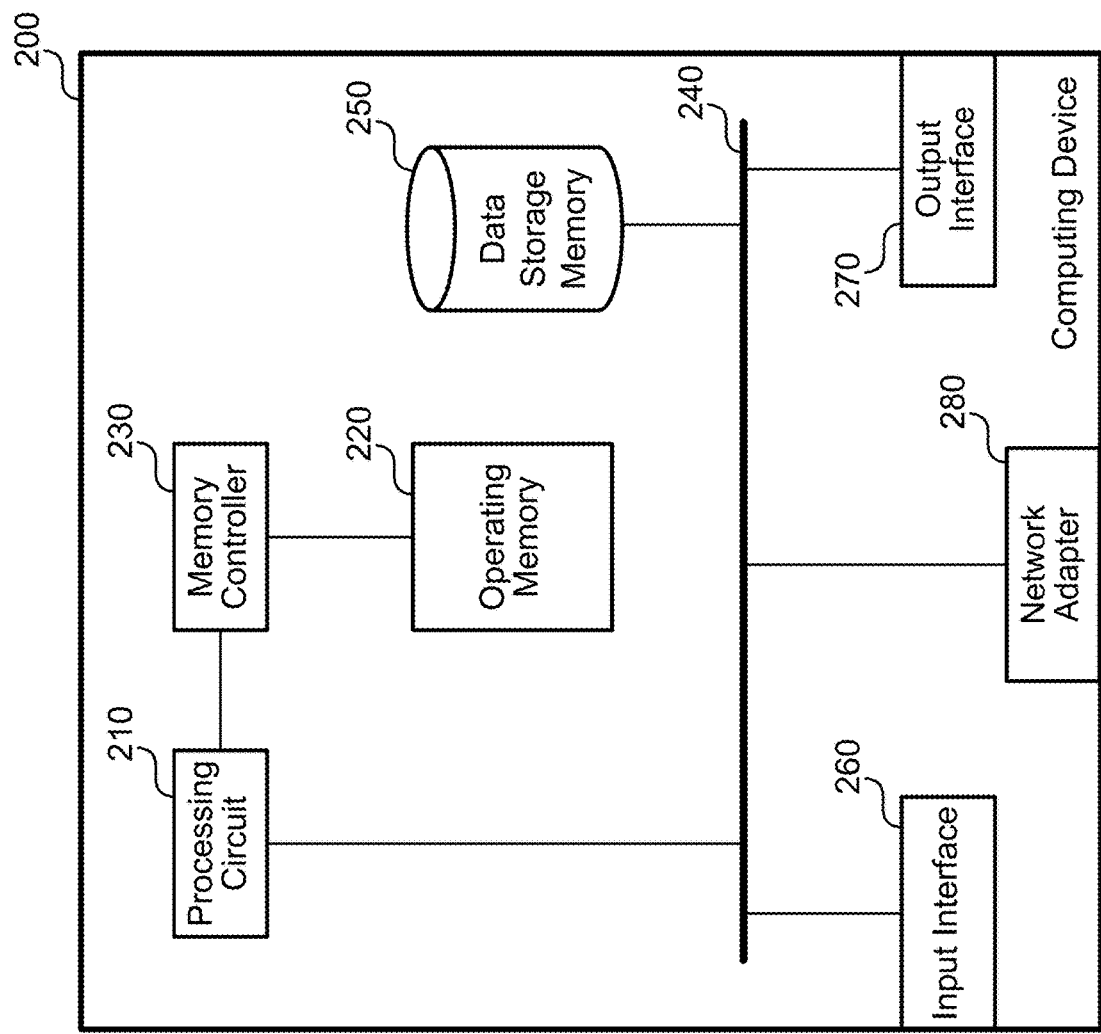
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, embedded device, programmable logic controller (PLC), or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices, nodes, members, or other entities illustrated in or referred to in various figures, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4th generation double data rate (DDR4) memory, 3rd generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangements are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is respectively adapted to execute processor-executable code that, in response to execution, enables computing device 200 to perform actions.

Illustrative Systems

Figure 3:
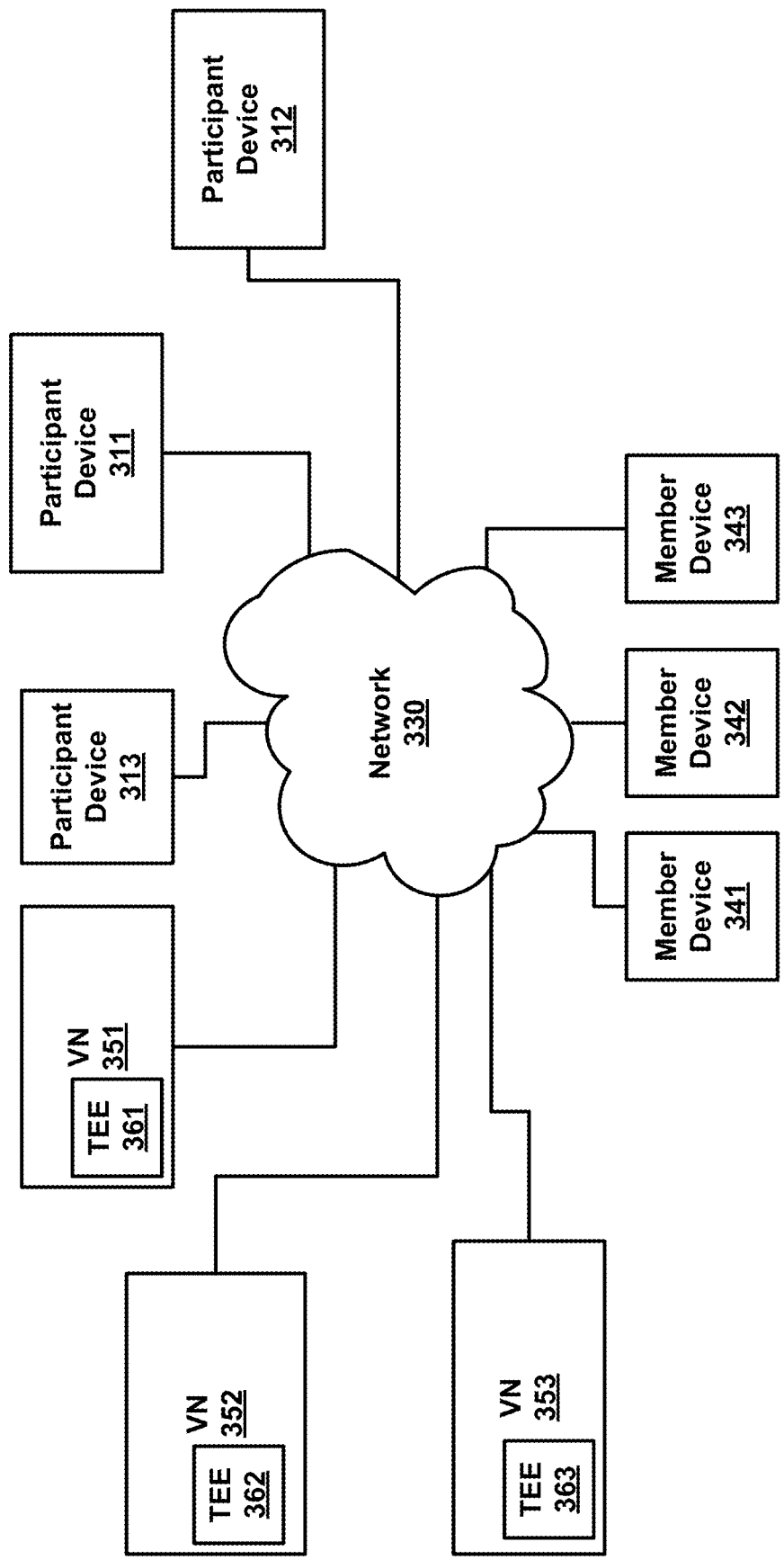
FIG. 3 is a block diagram illustrating an example of a system.

FIG. 3 is a block diagram illustrating an example of a system (300) for a blockchain consortium. System 300 may include network 330, VNs 351-353, member devices 341-343, and participant devices 311-313. Each VN 351-353 includes a corresponding TEE 361-363.

Each of the member devices 341-343, participant devices 311-313, and/or VNs 351-353 may include examples of computing device 200 of FIG. 2. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. Network 330 may include various other networks such as one or more networks using local network protocols such as 6LoWPAN, ZigBee, or the like. Some IoT devices may be connected to a user device via a different network in network 330 than other IoT devices. In essence, network 330 includes any communication method by which information may travel between VNs 351-353, member devices 341-343, and participant devices 311-313. Although each device or service is shown connected as connected to network 330, that does not mean that each device communicates with each other device shown. In some examples, some devices/services shown only communicate with some other devices/services shown via one or more intermediary devices. Also, although network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

In some examples, member devices 341-343 are devices used by members to communicate over network 330, such as for communication between a member and its corresponding VN, for example to endorse a VN. In some examples, participant devices 311-313 are devices used by members to communicate over network 330, such as to request a transaction.

In some examples, VNs 351-353 are devices that, during normal operation, validate and process submitted blockchain transactions, and execute chaincode. As mentioned above, in some examples, each VN 351-353 includes a TEE. In some examples, the TEE enables the creation of a protected region inside of a processor, so that the memory in the protected region is encrypted, and only decrypted inside the TEE. A TEE may be interchangeably referred to as an enclave, or, in some examples, the TEE can be seen as a subset of the enclave. TEE attestation can be used to verify the code running in the TEE. In some examples, the TEE allows integrity of the calculations occurring inside the TEE and confidentiality of what happens inside the TEE.

Some examples of a TEE are based on hardware, and others are based on software. Examples of a hardware-based TEE use hardware-based protection of a memory range that defines the address range of the TEE. In some examples, writes to the TEE are encrypted. In some examples, the CPU does not allow anything outside of the address range of the TEE to see that address range in clear text, and writes from outside of the address range area not permitted in the address range of the TEE.

In some examples, prior to a consortium blockchain network being established, certain details are agreed upon by prospective members of the blockchain network, including what blockchain protocol code is to be executed in the TEE of each validation node of the consortium blockchain network. During the establishment of the consortium blockchain network, one or more validation node may be endorsed by one of more members of the consortium blockchain network. Also, TEE attestation may be used to verify that validation node(s) are executing the agreed-upon blockchain protocol code. After the consortium blockchain network is established, in some examples, it is possible to change the initially agreed-upon parameters, such as the agreed-upon blockchain protocol code to be run in the TEE—in some examples, such a change requires approval by M of the N members.

System 300 may include more or less devices than illustrated in FIG. 3, which is shown by way of example only.

Figure 4:
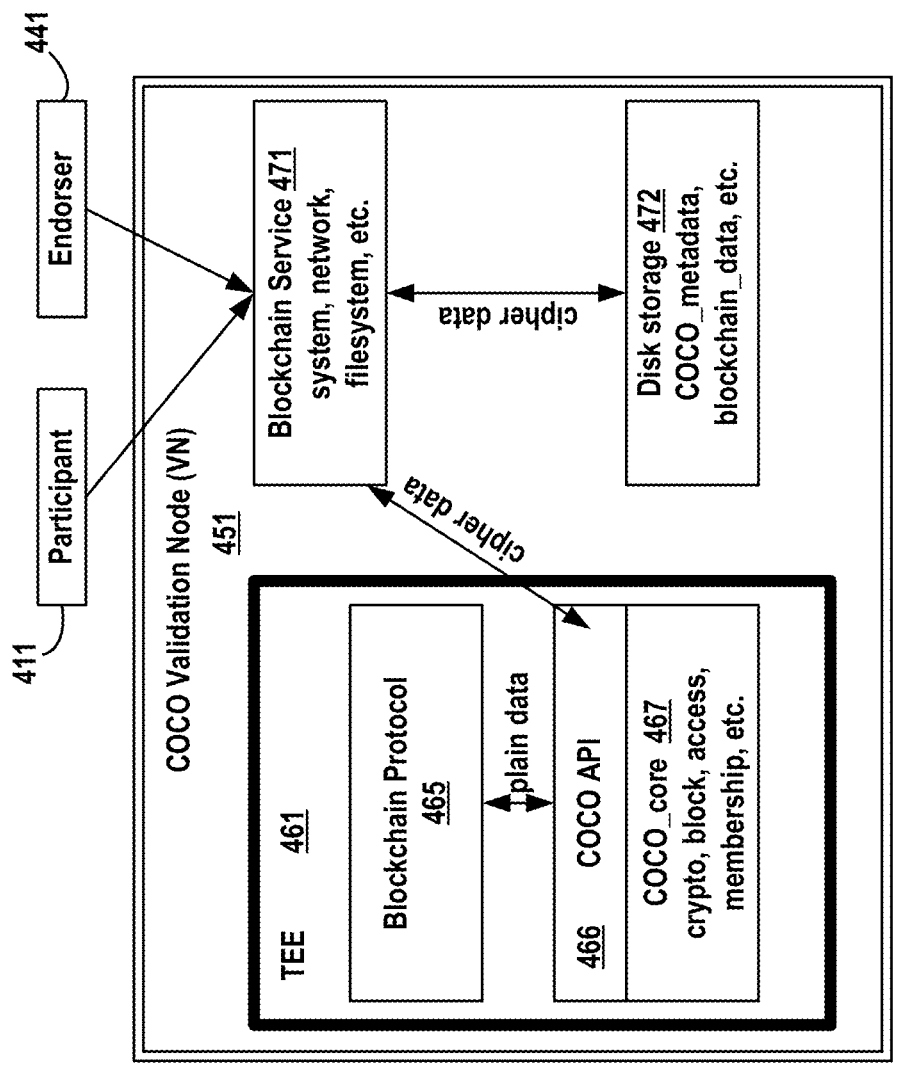
FIG. 4 is a block diagram illustrating an example of a validation node.

FIG. 4 is a block diagram illustrating an example of VN 451, which may communicate with, e.g., participant 411 and/or endorser 441. VN 451 may include TEE 461, blockchain service 471, and disk storage 472. TEE 461 may include blockchain protocol 465, Confidential Consortium (COCO) Blockchain Framework application programming interface (API) 466, and COCO core 467.

Blockchain service 471 may include software that performs functions for maintaining the availability and durability of the blockchain system. Disk storage 472 may, for example, include encrypted blockchain data and metadata when there is insufficient storage available in the TEE to store all of the data, or in other suitable situations. Blockchain protocol 465 may include the agreed-upon blockchain protocol code. In some examples, COCO core is the core COCO framework code, which is explained in greater detail below. In some examples, COCO API 466 is the API for the COCO framework.

VN 451 may communicate over a network with other VNs, one or more participant, and/or one or more endorser, including, for example, participant 411 and endorser 441, where endorser 441 is a member that endorses VN 451.

In some examples, everything in the VN outside of the TEE is modeled as untrusted. In some examples, the portions of the VN outside of the TEE function only to maintain availability and durability of the system. In some examples, there is a Sockets Layer (SSL), Transport Layer Security (TLS), or other secure tunnel between the participant or endorser and the TEE for secure communications, with the elements in the VN outside of the TEE being a pass-through for the secure communications.

In some examples, the lifecycle of the blockchain protocol in the TEE is governed by the software running inside of the TEE, based on the members' instructions, and later based on the decision of the consortium (e.g., quorum) as a whole, as discussed in greater detail below.

As discussed in greater detail below, although not shown in FIG. 4, in some examples, the TEE is split into two separate protected regions, one with the blockchain API, and the other one running the blockchain protocol, with a secure connection between them.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a computer-implemented process. As an alternate example, these processes may be encoded as processor-executable instructions and transmitted via a communications medium.

Figure 5A:
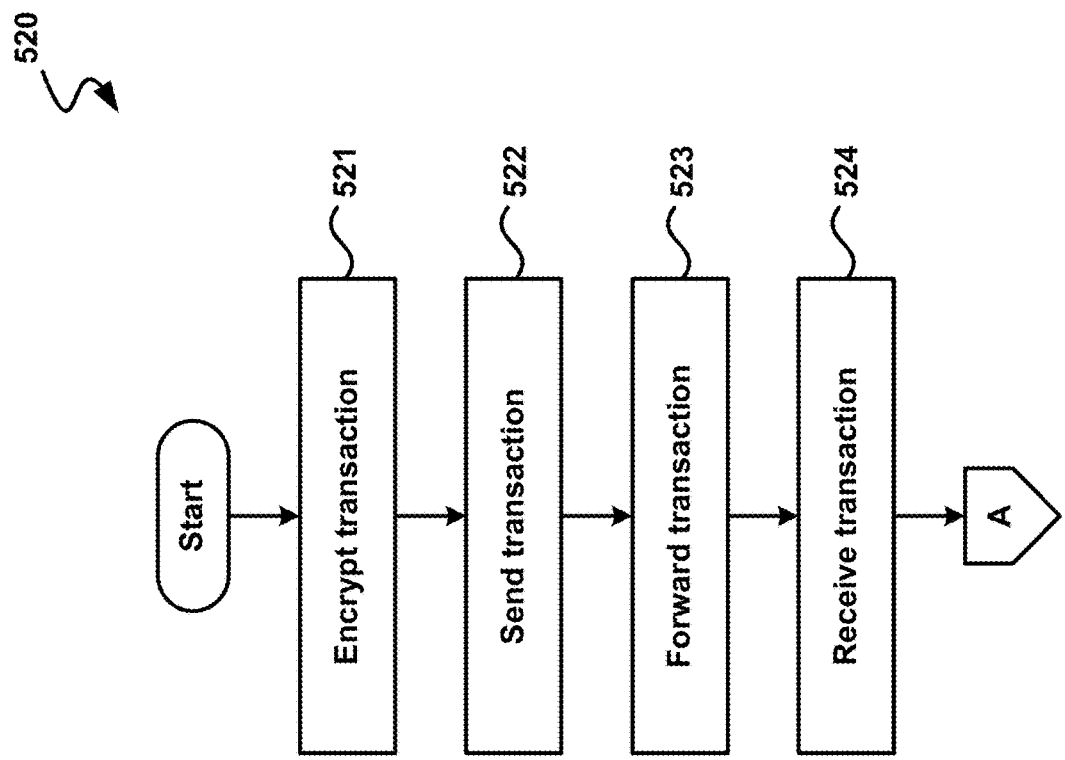
FIGS. 5A-5B are a diagram illustrating an example dataflow for a process for transaction processing for a blockchain network.
Figure 5B:
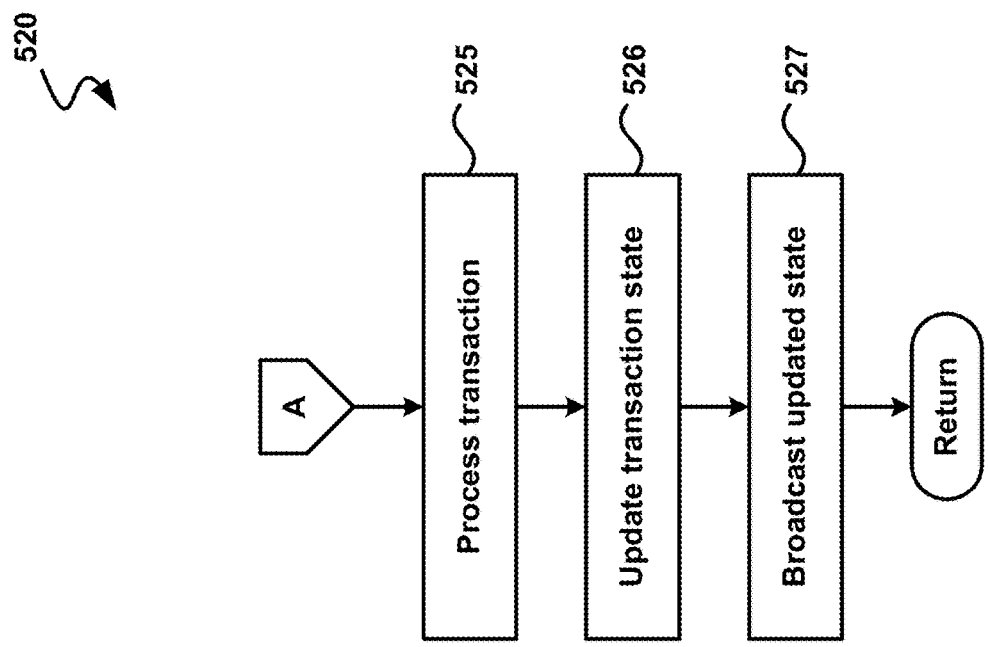

FIGS. 5A-5B are a diagram illustrating an example dataflow for a process (520) for transaction processing for a consortium blockchain network. Further details of an example consortium network are explained in greater detail below. In some examples, a blockchain consortium network has certain pre-agreements among prospective members before the blockchain consortium network is established. The pre-agreements may include, among other things, the initial members to be included in the blockchain consortium network and the type of blockchain protocol code to be stored in TEEs of validation nodes of the blockchain consortium.

In some examples, during establishment of the blockchain consortium network, and possibly at other times we well, TEE attestation is used to verify that the blockchain protocol code stored in the TEE of each validation node of the blockchain consortium network is the agreed-upon blockchain protocol code. Also, during establishment of the blockchain consortium network, the validation nodes of the blockchain consortium network may exchange private keys with each other. Also, during establishment of the blockchain consortium network, a blockchain master key may be generated based on the private keys of all members. The blockchain master key may be updated if there is a change to the membership of the blockchain consortium network.

Participants may be approved by members of blockchain consortium network. In some examples, participants are allowed to request/submit transactions and to see transactions that they are authorized to see, but do not have other rights of members, such as voting rights to vote on changing membership, changing the protocol blockchain code used, or the like.

In the illustrated example, step 521 occurs first. At step 521, in some examples, a participant encrypts a blockchain transaction with the blockchain master key. As shown, step 522 occurs next in some examples. At step 522, in some examples, the participant transmits the encrypted blockchain transaction. As shown, step 523 occurs next in some examples. At step 523, the encrypted blockchain transaction may be forwarded to a particular VN that is selected based on a conflict resolution protocol and/or a consensus protocol.

For instance, in some examples, a consensus algorithm may be used to elect a VN leader, and the VN leader receives transactions, commits transactions, and broadcasts the transactions to all of the other members. (The VN leader is interchangeably referred to as the master VN.) In these examples, at step 523, the consensus algorithm is used to elect the VN leader, and the encrypted blockchain transaction is forwarded to the VN leader. Other examples of using a conflict resolution algorithm and/or a consensus algorithm to select a VN to forward the encrypted blockchain transaction to, as well as further discussion of consensus protocols that may be used, are discussed in greater detail below.

As shown, step 524 occurs next in some examples. At step 524, in some examples, the VN to which the encrypted transaction was forwarded receives the encrypted blockchain transaction. As shown, step 525 occurs next in some examples. At block 525, in some examples, the VN processes the blockchain transaction by executing the code of the transaction.

As shown, step 526 occurs next in some examples. At block 526, in some examples, the VN updates the official state of the processed blockchain based on the processing of the blockchain transaction. For example, this may be a direct updating of the state by the VN. "Directly" updating the state means that the VN updates the state without any actions or confirmation being required by any other entity in order to update the state. As shown, step 527 occurs next in some examples. At step 527, the updated official state of the processed blockchain may be broadcast to the blockchain network.

In some examples, because of the trust, VNs do not need to do re-computation for verification, which makes it possible for blockchain states to be directly updated at step 526. In some examples, because the VNs in the blockchain consortium network are fully trusted, other VNs on the network can implicitly accept any blockchain state updates it receives from a trusted VN as being compliant with the blockchain's protocol and protected from external tampering by the TEE. Further, there is no need for a copy of the transaction in order to confirm a block.

The process then proceeds to a return block, where other processing is resumed.

In some examples, prior to transaction processing over a blockchain consortium network, the blockchain network is established. Establishment of the blockchain consortium network may be accomplished as follows in some examples. In some examples, each prospective member endorses at least one separate VN. In some examples, as part of the validation, the prospective member stores the agreed-upon code in the TEE, and stores the public/private key pair (PBK and KBK respectively) in the TEE. Some of the agreed-upon aspects may also be stored in the VN, such as the agreed-upon membership list and an identification of the agreed-upon code to execute in the TEE.

Alternatively, in some examples, not every prospective member endorses a separate VN. For instance, in some examples, only one VN is endorsed.

Next, in some examples, each VN discovers the other VNs in the network. In some examples, there is only one VN, and VN discovery is not performed.

Next, in some examples, from each of the prospective members of the consortium, the following are received by the VN: a plurality of membership lists, and a plurality of authorizations from the plurality of prospective members of the consortium. In some examples, the authorizations are indications associated with a pre-determined type of protocol code. In some examples, the membership lists and authorizations are sent by each of the VNs and each VN receives the memberships lists and authorizations sent by each other VN. In other examples, there is only one VN, and the memberships lists and authorizations are received from the member devices of the prospective members.

Next, in some examples, a determination is made as to whether the membership lists from each of the prospective members match each other. If so, in some examples, a determination is made as to whether the authorizations of the type of protocol code from each of the prospective members match each other. If so, TEE attestation may be used to verify that nodes associated with prospective members of the consortium stores the agreed-upon authorized protocol code to be run on the TEE. If the TEE attestation is positive, private keys may be exchanged among the VNs.

Next, in some examples, a blockchain master key (BMK) may be generated from each of the private keys. Next, in some examples, participants are approved to join by members. In some examples, the network is now ready to process transactions from participants.

In some examples, a public network may allow any participant to submit transactions, but a non-public network requires participants to be provisioned, which is another privilege of a VN's endorser. Participants may be represented by a public/private key pair that's allowed to submit transactions for execution by the network. The set of participants does not necessarily include the members, though in some examples it does. Members may authorize participants by submitting to their VN the public transaction key (PTK) of a participant, and VNs may share, with the network, the list of their provisioned participants. If a network requires participants to be approved by more than one member, the network may use a protocol similar to that of approving a new member, as discussed in greater detail below.

In some examples, chaincode need not be executed more than once by the network, chaincode may be non-deterministic, and chaincode may include interactions with external systems. In some examples, blockchains may also be constructed with varying levels of defense against hostile participants attempting to compromise integrity and confidentiality, from protection against a single rogue member, to M of N voting, to requiring all members to agree on state changes. The network may accommodate arbitrary blockchain abstractions, arbitrary blockchain protocols, and arbitrary ledgers, and may be able to integrate existing blockchain technologies of any type. Herein, with regard to M of N voting, N refers to the total number of members, and M refers to the number of members for establishing a quorum in a vote.

Examples of the network may enable improving the performance characteristics of blockchains without changing the trust assumptions between the members. Examples of the network may allow for data to remain private when put onto a blockchain so that only relevant parties can see a transaction. Examples of the network may enable code that runs inside of a blockchain to be non-deterministic, so that, for example, a different result may be produced every time. Examples of the network may achieve such results without introducing unneeded complexity, introducing additional significant performance overheads, or introducing an unnatural trust assumption.

Examples of the network make use of a TEE in such VN so that, the code inside of the TEE can have the trust accepting that the operating system and the other user-mode code around the TEE in the operating environment of the TEE is completely untrusted, and yet the TEE can still operate in a trusted way by relying on the hardware-enforced privacy (e.g., by leveraging or otherwise employing Software Guard Extensions, a Platform Security Processor, a Secure Execution Environment, or the like) and the TEE can project the trust externally by establishing a secure connection to some endpoint outside of the TEE. In some examples, this allows integrity of the calculations occurring inside the TEE and confidentiality of what happens inside the TEE. Examples of the network use the trust associated with the TEE as the building block of trust assumptions in the blockchain system.

In some examples, each VN in the network is fully trusted by the network by virtue of the fact that other VNs can verify the endorsement of a VN by its endorsing member, and using TEE attestation that the VN is executing code approved by the membership. As previously discussed, VNs may establish trusted connections with each other through a similar process to endorsement where, after a VN attests to the fact that the VN's code is a trusted version running in a trusted TEE, as well as to the fact that it has the same membership list, other VNs release the KBK of their endorsing member. In some examples, the output of one node that is provided as input from another node can be trusted because the code that generated the output is proven to be trusted code previously approved by the membership. In some examples, all the contents of the blockchain are encrypted, and the contents of the blockchain are only decrypted inside of a TEE with a valid attestation, which enables confidentiality. Also, the code in a TEE with valid attestation can be non-deterministic—since the TEE is trusted, there is no need for other nodes to reproduce the results of other nodes in such examples.

In some examples, the VNs operate according to a Confidential Consortium (COCO) Blockchain framework, which allows any suitable blockchain protocol to be used, and allows any suitable consensus protocol to be used in conjunction with the COCO framework. Despite the word "confidential" in COCO, some examples of the COCO framework include confidentiality, and some examples of the COCO framework do not include confidentiality. In some examples, the COCO framework is not used by itself, but in conjunction with, for example, a blockchain protocol and a consensus protocol selected by the membership. In some examples, the COCO framework is the code operating in the VN that is used for establishing the blockchain network, enabling arbitrary blockchain and consensus protocols, arbitrary blockchain ledgers, arbitrary blockchain abstractions, and the use of any suitable blockchain technology. In some examples, most of the COCO code is executed in the TEE, but some peripheral aspects of COCO may execute outside of the TEE, as discussed in greater detail below. In some examples, the COCO framework does not itself define blockchain ledgers and the actual blockchain transaction processing, but allows any suitable ledgers and blockchain protocols to be used, and enables confidential properties for the transactions, governs trust assumptions, allows chaincode to be executed only once by the network, allows the chaincode to be non-deterministic, and allows chaincode to include interactions with external systems. The COCO framework may also include varying levels of defense against hostile participants attempting to compromise integrity and confidentiality, from protection against a single rogue member, to "M of N" voting, to requiring all members to agree on state changes. A network of VNs that operate according to a COCO framework being executed on each of the VNs may be referred to as a COCO network.

As discussed above, in some examples, the members initially agree on certain approvals, including, for example, who the members will be, what code is approved to execute in a TEE, what processor(s) are acceptable, what constitutes an accepted TEE, what COCO framework to use, what software versions of blockchain code will be executed, and each member starts at least one VN. In some examples, each member maintains at least one VN, each of which participates in the blockchain network's transaction processing and consensus protocol. In other examples, each member does not necessarily maintain its own VN.

In some examples, certain initial approvals require unanimous agreement in order for the network to be established, and other of the approvals may only require agreement among a quorum of prospective members or the initial approval may be determined based on a consensus protocol. In some examples, if a member wishes a certain initial approval, such as the initial membership list, to require the membership list to be the same for all members, then upon endorsement of the node, the member may include code in the TEE that operates so that node will only join the network if all of the membership lists match.

In some examples, during normal operation, VNs validate and process submitted transactions, and execute chaincode. A member may deploy a version of the blockchain protocol implementation that they trust to a Trusted Execution Environment (TEE), and once the blockchain code attests to the fact that it is code that the member trusts and that it's executing in a TEE also trusted by the member, the member endorses the VN by provisioning it with their public and private blockchain keys (PBK and KBK, respectively). In some examples, the owner of a VN is considered its endorser, and the endorser can update the membership list the VN trusts by submitting the public blockchain signing keys of the members.

In some examples, consensus is required for membership and protocol updates, as well as updates to blockchain and chaincode state. In some examples, the consensus algorithm used in one of the agreed-upon parameters for establishing the network. In some examples, every VN fully trusts every other with which it has established a trusted connection. Accordingly, in some examples, so long as blockchain updates are non-conflicting with the existing state maintained by a VN, it can be unequivocally accepted; in these examples, it's only when there's potential for conflicting updates that an explicit consensus protocol is required. There are several ways that the network can implement consensus in various examples, but in some examples, the network does not require wasteful proof-of-work, latency-causing time-bound, or potentially unfair proof-of-stake algorithms.

In some examples, consensus relies on Paxos or one of the many Paxos-like consensus algorithms, which is practical when the network consists of a relatively small number of consensus participants. In some examples, the blockchain code executing in the TEE implements consensus, and because the code is trusted, there is no need to defend against byzantine faults such as malicious messages. In some examples, Paxos is allowed to set to grow to accommodate at least one VN of each member, though in some examples more than one is not included so as to keep the consensus participant set small for maximum efficiency. In some examples, Paxos-type consensus is used to implement high-availability for centralized databases, so example small networks can use this to achieve database-level throughput and latency. This approach may ensure that there's one version of the blockchain state that's agreed upon by the network's majority.

Figure 6:
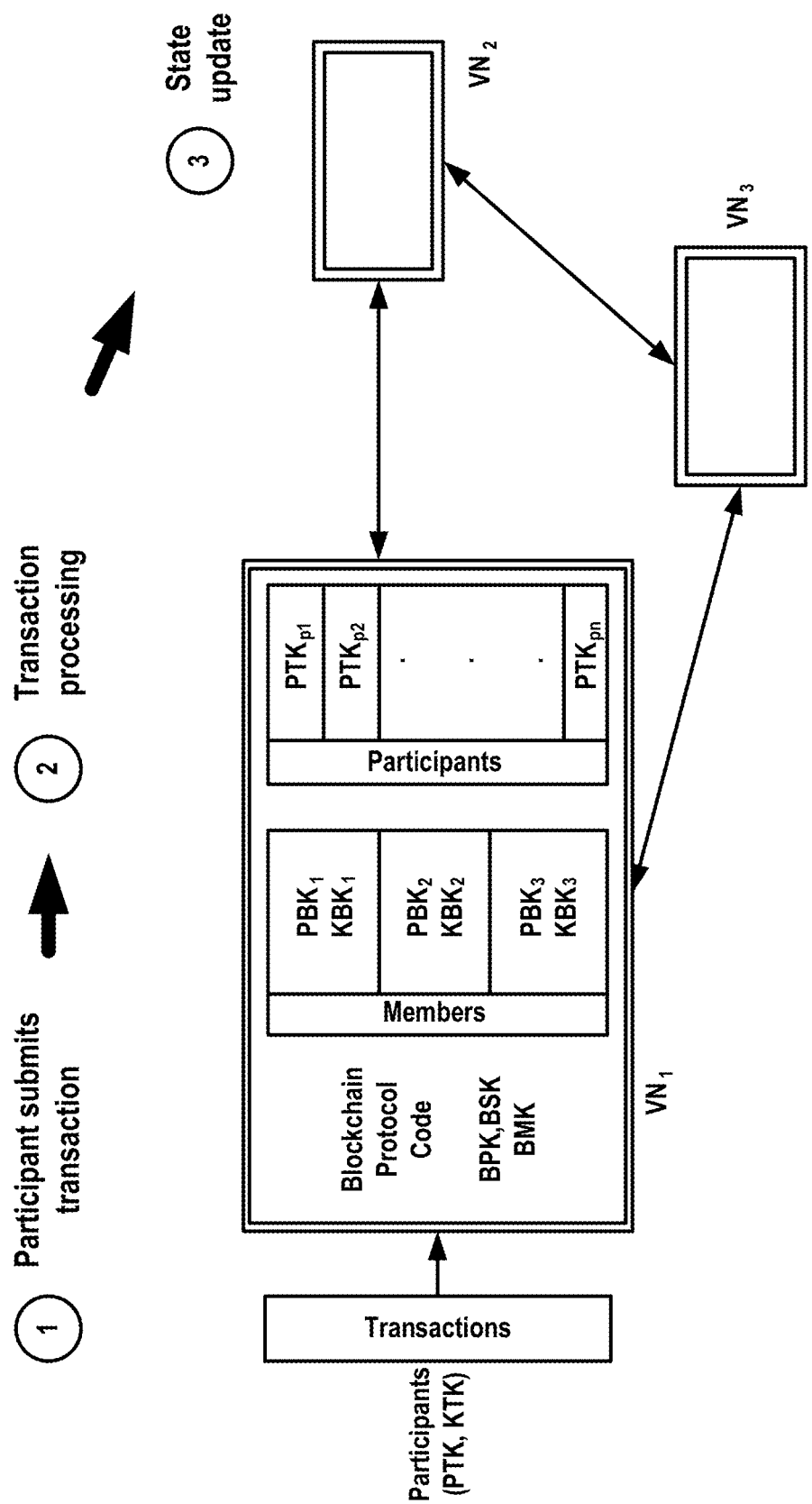
FIG. 6 is a diagram illustrating another example process for transaction processing for a blockchain network.

FIG. 6 is a diagram illustrating an example dataflow for a process (660) for blockchain transaction processing.

First, a participant may submit a transaction. In some examples, the transaction is encrypted with the BMK.

In some examples, any VN in the network may accept and process transactions, and a conflict resolution protocol is used. One possible example conflict resolution protocol can be built on having a VN tag the smallest potentially-conflicting updates to blockchain state with a randomly-generated number (using the TEE's randomness facilities to ensure the randomness of the value). In some examples, when a VN receives a transaction that conflicts, it accepts the one with the highest tag, and once it has received ½N+1 confirmations for a transaction, it considers it committed and appends it to its copy of the persistent blockchain. In some examples, a VN keeps track of all transactions it receives that have not been majority agreed-upon, and discards any transactions that conflict with ones that commit (for example, a transaction that would represent a double or overspend of a member's tokens).

In some examples, a received transaction forwarded to the VN acting as a master based on the consensus protocol. In this example, the master VN then receives the transaction.

Next, the VN which is to process the transaction, according to a consensus algorithm, conflict resolution algorithm, or the like, may process the transaction by executing the code of the transaction. In some examples, the master VN then resolves any conflicts. In some examples, all the data inside of TEE is in plain text. In some examples, data outside of TEE (disk/network) is signed by BSK and encrypted by BMK. In some examples, each VN stores a full copy of the ledger, the data inside the TEE is in plain text, and data outside of the TEE, such as data on disk or being communicated over the network, is signed by the BSK and encrypted by the BMK.

In other examples, each VN need not store a copy of the ledger. In other examples, the ledger can be stored in an external storage cloud service or in an on-premises storage array.

Next, the VN may broadcast the transaction and the state of the transaction to the other VNs. Next, the VN may directly update the blockchain state. In some examples, because of the trust, VNs do not need to do re-computation for verification, and blockchain states are directly updated.

Figure 7:
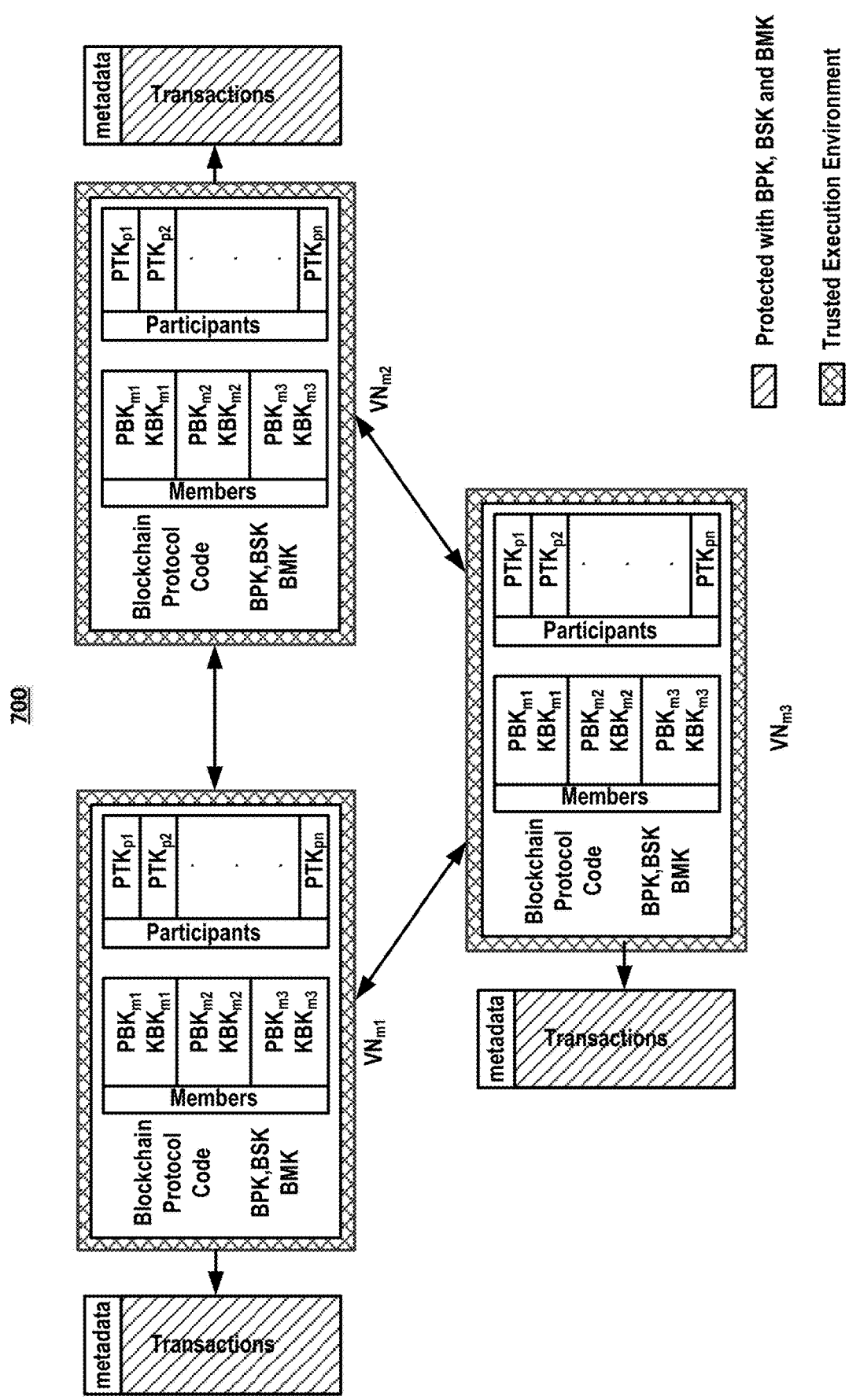
FIG. 7 is a block diagram illustrating an example of a system including a Confidential Consortium Blockchain Framework (COCO) network with three members.

FIG. 7 is a block diagram illustrating an example of a system including an example COCO network (700) with three members and three corresponding VNs. FIG. 7 shows an example COCO network where three VNs have been provisioned, each by a different member.

The public key for member i is depicted as PBKmi, and its private key KBKmi. The VNs in the example of FIG. 7 have established trusted connections and shared these keys.

In some examples, once the trusted network is established with a majority of members represented by VNs, a foundation is in place on which blockchain protocols can be implemented that employ efficient consensus algorithms, where a single VN can act on behalf of the entire network such that other nodes accept the transactions, including chaincode transactions, knowing that they conform to the rules of the blockchain.

In some examples, VNs can also unilaterally, or by a voting scheme, approve participants, including themselves. In some examples, a participant has no network voting privileges, but by virtue of the network being provisioned with their public transaction keys (PTKs), can submit transactions.

By leveraging the network's trust, a VN's blockchain protocol code may accept transactions from other VNs knowing that they adhere to the blockchain protocol rules, and commit any that do not conflict with any already committed transactions. In some examples, if a transaction conflicts with another uncommitted transaction, the VN uses a consensus protocol to determine which transaction wins, and the majority of the VNs will quickly converge on the winning transactions. Further, because a VN's execution may be protected by a TEE from outside inspection, it may implement arbitrary confidentiality models, including only allowing the members that are participants in a transaction to see the transaction.

In some examples, VNs protect the integrity of externally stored blockchain state by using a pair of blockchain public key and private key (BPK and BSK), and optionally its confidentiality by using a blockchain master key (BMK) derived from a set of KBKs of the members. In some examples, KBKs are shared across the VNs of a network for this reason. In some examples, BMKs are specific to a membership set, and a flexible M of N scheme protects BMKs from compromise by fewer than M colluding members. In some examples, when the membership set updates, the network generates a new BMK to protect all subsequently appended states.

Various examples above discuss the establishment of a consortium blockchain network and transaction processing in a consortium blockchain network. In some examples, the membership, protocol code, consensus code, processor, and other parameters are fixed. In other examples, one, some or all of these parameters may be changed by a member vote. As discussed above, in some examples, the BMK can only be recovered with the consent of M of N members. Similarly, changes to some or all of the parameters discussed above may be changed by M of N voting, where N is the total current number of members, and M is a number from 1 to N that is the quorum for changing a parameter, where M is one of the agreed-upon parameters when initially establishing the consortium blockchain network. As discussed above, in some examples, members have voting privileges, and participants that are not members do not have voting privileges.

In some examples, the addition of new participants also requires M of N voting. In other examples, a member can unilaterally add new participants. Whether the additional of new participants requires voting may be one of the agreed-upon initial parameters.

In some examples, members are entitled to a vote in the approval of additions to, and removals from, the network's membership list, and to a vote on changes to the set of approved blockchain implementations the network allows to participate. Further, in some examples, for networks that require participants to be authorized by members, members can also approve the set of participants that have permission to submit transactions to the network. The protocol for reaching agreement among members, including requiring a plurality, majority or unanimous vote, may be implemented by the blockchain protocol code.

In some examples, each member is represented with a public/private key pair (PBK and KBK) that the member uses to bootstrap their membership in the COCO through a process of endorsement. In some examples, endorsement represents the fact that the member fully trusts a specific implementation of the network's blockchain protocol. In some examples, VNs execute endorsed blockchain code in a Trusted Execution Environment (TEE), and each VN is endorsed by exactly one member. For example, code that is stored on the blockchain can be executed as part of a transaction. In some examples, as part of the endorsement operation, a member shares the member's KBK with the VN. In these examples, because the member shares the member's KBK with the VN, for security reasons, it may be useful for the member to trust the blockchain protocol implementation and the TEE to not to leak the key. This trust may be accomplished by careful review of the blockchain protocol and its implementation, and based on the threat model and risks of a TEE compromise. In some examples, each member endorses at least one VN, but endorsing multiple nodes can provide high availability.

Endorsement may provide the endorsing member the exclusive ability to authorize which other members and other implementations of the blockchain protocol implementation the VN will participate with. In some examples, a VN will accept membership updates and approval to trust blockchain protocol implementations other than its own only from the VN's endorsing member. In some examples, to protect all the VN's external communications, a VN generates a public/private key pair using the TEE and shares its public key externally. A member may establish a secure tunnel with a VN, including potentially ones for which the VN is not the endorser, using the VN's public key. The VN may then use proof-of-possession of the VN's KBK to authenticate VN requests.

One type of VN request is authorizing a network member, which as mentioned, only a node's endorser can execute in some examples. In some examples, to authorize a member, the endorser submits the PBK of that member. In some examples, once populated with the endorser's keys and the list of network members identified by their PBKs, a VN can join the network. In some examples, joining is the act of a VN establishing trusted connections with the network's other VNs. A network may use a discovery protocol that suits the network's requirements to provide a VN the ability to find and connect with the network's other VNs. For example, the endorser may provide the list of nodes by submitting the nodes' DNS names, IP addresses, or identifiers specific to the blockchain network's discovery and connection system.

As discussed above, in some examples, establishing a trusted connection with another VN starts with the creation of a mutually-authenticated secure tunnel built on the public keys of the communicating VNs. As part of the trust establishment, in some examples, a VN proves that it possesses its endorser's KBK. In some examples, this ensures that a remote node has been endorsed by an authorized member, since the tunnel proves that the node can provide an endorsement referencing the VN's public key signed by a member's KBK that matches the member's PBK.

Figure 8:
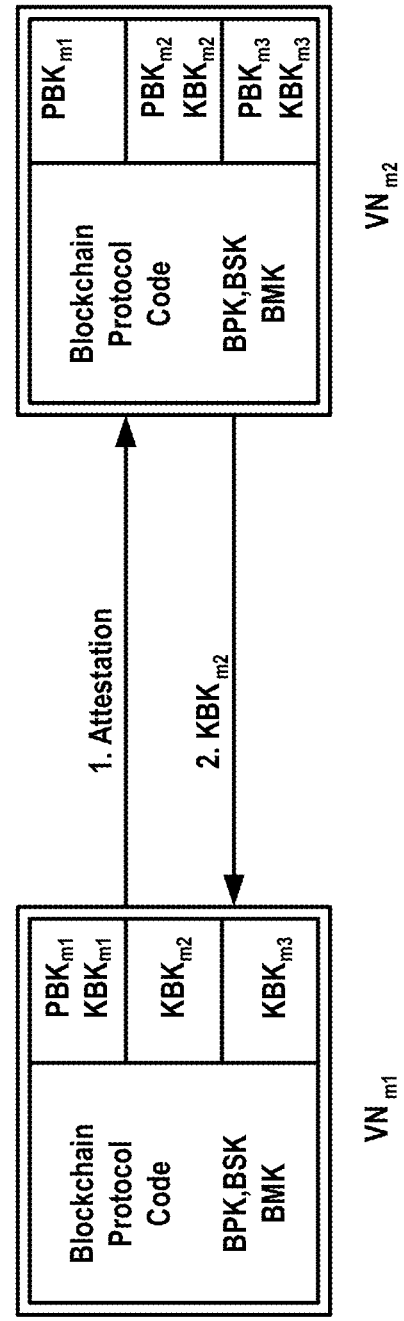
FIG. 8 is a block diagram illustrating an example of system that includes a portion of a COCO network including two validation nodes undergoing validation node attestation and key exchange.

FIG. 8 is a block diagram illustrating an example of system (800) that includes a portion of a COCO network including two validation nodes undergoing validation node attestation and key exchange as the final part of a new member joining the network.

FIG. 8 shows an example of VN attestation and key exchange as the final step in establishing trust between nodes via an exchange of the exact version of the blockchain protocol implementation the node is running, as well as a comparison of membership lists. A node may do this using TEE attestation, which includes proof that the node is running the specific implementation in a specific TEE.

In some examples, once a VN determines that a remote node is executing trusted code in a TEE that the VN also trusts, the VN checks to make sure that the remote endorser is in the local membership list, and if so, the channel is considered trusted and the VN will accept blockchain updates from the remote node. In some examples, this means that the VN is confident that the remote node will not expose or leak data that the blockchain protocol doesn't allow. In some examples, the agreed-upon membership set itself can be kept confidential by having VNs refer to members by hashes (e.g., salted hashes) of their PBKs, rather than the PBKs themselves. In some examples, once a trusted connection is established, a VN shares the VN's endorser's KBK.

In some examples, there are two ways that the blockchain evolves: membership updates, as described above, and blockchain code updates. When the network agrees on a protocol update, this may result in the desire for the network to accept one or more new implementations of the blockchain code. A member that wishes to upgrade the blockchain code may shut down their existing VNs and launch new ones in place of the existing VNs. The member may choose to allow the new VNs to trust previous versions, or to only trust new versions. Trusting existing versions may ensure that transactions can continue to be processed while the new version doesn't have a M of N majority, but new versions and not existing versions may be done instead if the previous code is considered untrustworthy for some reason, or if the complexity to maintain protocol compatibility it too great. Cross-version incompatibility during the upgrade may interrupt transaction processing, however.

In some examples, the establishment of trust between VNs that represent every member results in each node eventually obtaining a copy of the KBKs of all the network's members. In some examples, a node will accept blockchain updates signed with the private signing key of the members that the node is provisioned to participate with, regardless of whether the node receives the transactions directly from the member's VN, or from another trusted VN.

Adding a new member to the network may require that a VN's endorser proposes it to the network by provisioning the PBK of the new member. The endorser may then let the other VNs know of the proposal, and the fact that the endorser has voted for the new member's admission to the network. As other members propose the same member, their VNs may note the vote and let the network know. In some examples, a VN does not accept blockchain updates proposed by a member until some threshold of members have voted to admit the member. In various examples, this can be a unanimous decision, require N/2+1 votes, or some other threshold.

Figure 9:
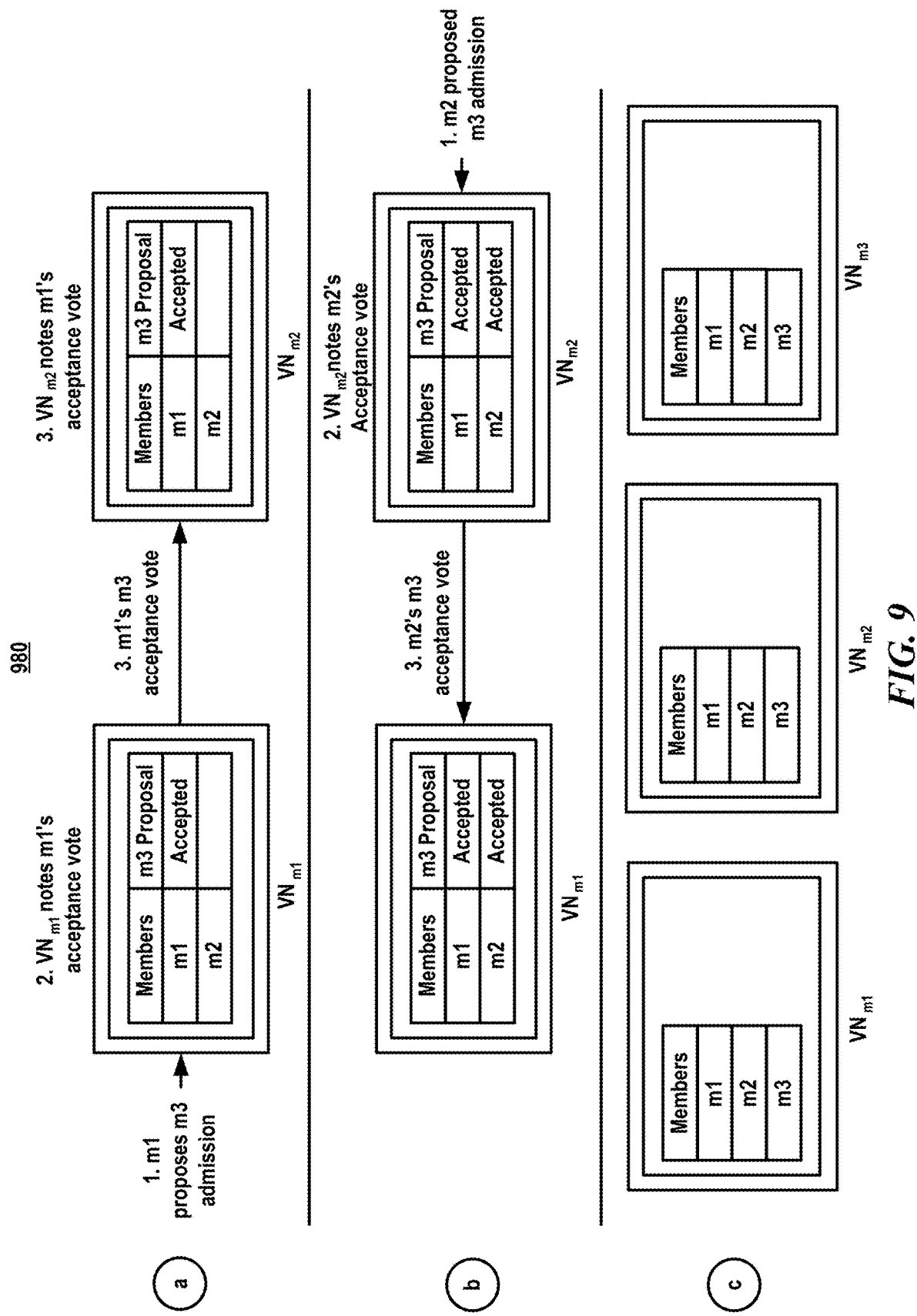
FIG. 9 is a diagram illustrating example steps for adding a new member to a COCO network.

FIG. 9 is a diagram illustrating example of a process (980) for adding a new member to a consortium blockchain network. FIG. 9 shows an example of the steps followed by a network with two members (m1 and m2) adding a third member m3. An example of the steps of FIG. 9 proceeds as follows. In (a), member m1 proposes the new member, m3. The member's VN notes the proposal and the member's endorser votes, and then passes the proposal to the other VNs. The VN of m1 notes the proposal and m1's admission vote. Then in (b), member m2 proposes the new member, and both VNs note the vote, which is now unanimous, so in (c) each VN has added the new member and once it does, the VN considers the new member in voting and will accept blockchain updates from the new member.

In some examples, at any time, a member can request that the blockchain network (meaning the VNs) remove it from the membership set. However, in some examples, a VN will only remove a member when either a majority or all VNs representing members except the one being removed agree to remove the member, depending on the membership rules of the network. In some examples, a majority ($\geq \frac{1}{2}N+1$, where N is the initial membership count), with the caveat that the removing member does not have a vote (so effectively $\geq \frac{1}{2}N$), is required to remove a member, in order to prevent a rogue member from instructing its VNs to remove all other members, which would leave it with the ability to decrypt all of the blockchain's state (examples of the blockchain encryption scheme are discussed in greater detail below). In some examples, when a member is removed, VNs destroy the VNs' ephemeral copies of the member's private symmetric encryption key and trigger the generation of a new membership metadata block.

A member may also request a key rollover operation, whereby the membership metadata is updated to reflect the new public key and the member's old KBK is encrypted with the new one and stored in the membership metadata. In some examples, once rolled over, the network will not accept any transactions referencing the old KBK. However, the network may allow the member to access any transactions associated with the old key when a member proves they have access to the new one, which may enable the member full access to their data while preventing access by the old key.

Once a COCO network is established, the network may accept transactions from participants.

In some examples, beyond COCO's options for membership, trusted connection establishment, and consensus, COCO supports arbitrary blockchain protocols. For instance, the blockchain code may implement Ethereum, Corda, Chain Core, or a Hyperledger system. However, existing systems are not designed to take advantage of the trust and confidentiality properties of some examples of COCO.

In some examples, because COCO VNs are fully trusted, other VNs on the network can implicitly accept any blockchain state updates it receives from a trusted VN as being compliant with the blockchain's protocol and protected from external tampering by the TEE. This allows the possibility of one-time and non-deterministic execution of chaincode. Chaincode may use the TEE's non-determinism, for example, to generate random numbers for use in lotteries or to resolve conflicts. The chaincode may also call out to external systems, which may replace the need for on-chain oracles with external ones trusted by the chaincode, with the advantage that the external system may be referenced at the time a VN accepts the chaincode transaction. Chaincode can also execute external operations that have side-effects, so long as compensating actions can undo the operation if there's any possibility that such an operation will be rendered obsolete by a superseding conflict or the transaction is lost before it is committed by a majority of the VNs.

With the COCO trust foundation, arbitrary confidentiality models may be built.

For example, first, a participant may ensure that the network, or more specifically, the VN to which it is submitting transactions will be confidential by encrypting the transaction with the PBK of a member's KBK. In these examples, only VNs of a network the VN's representative member has endorsed will have access to the contents of the transaction, which may include sensitive information. For networks where participants wish to only reveal transactions to VNs that are part of networks with additional members, a transaction may be encrypted with a unique key that itself is encrypted with an M of N encoding of the PBK's of those members.

In some examples, where a member designates a transaction between itself and another member or members as confidential, the VNs all process the transaction in the clear, but the transaction itself is stored in the blockchain encrypted with the BMK. In some examples, the VNs then only allow the members involved in the transaction to see the transaction. The same model may be applied to chaincode and chaincode state.

In other examples, instead, a majority of members may request to reveal an otherwise confidential transaction, something that may be desirable for cases where the consortium subsequently requires a full view of historical activity. Other examples allow for the provisioning of auditing members. Just like for M of N acceptance of new participating members, an M of N scheme can enable members to agree to admit members with special privileges, like being able to read all transactions, even ones marked confidential.

One aspect of example blockchain networks is how the VNs achieve consensus. Distributing transactions throughout the network may be performed using multi-cast, broadcast trees, or any other protocol deemed efficient by the membership for the scale of membership and the topology of the VN communications network. In some examples, the trusted nature of VNs means that consensus can be achieved as quickly as messages can be distributed to a majority of the nodes.

In some examples, in a model where any VN can accept transactions, each VN can build a different version of the blockchain. At any time, a VN may have some transactions that have been committed by majority subset N of the VNs, and other transactions committed by a different subset N. In some examples, because eventually all nodes converge to a common view of the committed transactions, the committed blockchain state of every VN is a correct representation of the blockchain's state, even if the order of blocks is unique.

COCO networks may be built with other consensus protocols, but some examples use consensus protocols that can take advantage of the fact that a message received from a trusted VN is itself trusted to achieve efficient agreement and maximum throughput.

In some examples, transaction processing proceeds as follows. First, a participant submits a transaction. The transaction submitted by the participant may be encrypted with the BMK and forwarded to the VN acting as a master based on the consensus protocol. (The master VN is interchangeably referred to as the leader VN.) In this example, the master VN then receives the transaction and processes the transaction by executing the code of the transaction. In this example, the master VN then resolves any conflicts, and broadcasts the transaction and the state of the transaction to the other VNs. In one example, each VN stores a full copy of the ledger, the data inside the TEE is in plain text, and data outside of the TEE, such as data on disk or being communicated over the network, is signed by the BSK and encrypted by the BMK. The VN can then update the transaction state directly.

In other examples, each VN need not store a copy of the ledger. In other examples, the ledger can be stored in an external storage cloud service or in an on premises storage array.

A COCO blockchain's persistent state, meaning the state that's written to durable storage, may include three types of data: metadata, transactions, and chaincode state. Chaincode code may be considered part of chaincode state. A pair of blockchain public key (BPK) and blockchain private key (BSK) may be used to protect the integrity of the persistent state. The BPK may be used to verify the block state digests signed by the corresponding BSK. In some examples, the chain is append-only with any additions to the chain bound to previous portions of the chain using BSK-signed digests. If the BSK leaks, rogue or colluding members may be able to compromise the integrity of the blockchain, which is why, in some examples, the BSK is generated in and exclusively sealed within TEEs.

In some examples, the metadata includes the BPK in plaintext for integrity verification. In some examples, the confidentiality of any blockchain state that is not to be exposed in the clear is protected, using symmetric cryptography, with a blockchain master key (BMK). The BMK may also be part of the blockchain metadata, in a protected way, because a quorum of members may need or want to decrypt and recover the blockchain data bypassing TEEs in case of emergency (e.g. disaster recovery after all TEEs are destroyed).

In some examples, blockchains include ledgers that grow over time. In some examples, a blockchain ledger may grow too large to be stored in the TEE, and is stored to disk instead. In some examples, when private data is stored to disk, the BPK and BSK enable data to be stored on disk, and to verify, once the data is read back in, that the data hasn't been tampered with. In some examples, the BMK may be used to encrypt private data stored to disk, so that even when the data is stored on disk, the data cannot be seen.

One approach to protecting the BMK, as used in some examples, is to store in the blockchain metadata a copy of the BMK for each member that's encrypted to that member's KBK. This may prevent the BMK from leaking beyond the members. However, in some examples, it does not defend against a rogue or compromised member from leaking it.

To defend against rogue nodes or colluding members, COCO-based blockchains may use M of N encryption schemes to require that the KBKs of some threshold number of members must be known to obtain the BMK. VNs may then gain access as soon as they join with enough other VNs endorsed by that number of members, but, in some examples, no sooner. In some examples, since a member only has access to their own key outside of the TEE, it takes at least M members to leak or share their KBKs for the chain to be decrypted outside of a VN's TEE.

While M can equal N, or even be 1, some examples of a COCO implementation require that M be at least $\frac{1}{2}N+1$ and match the membership set agreement consensus model, which may ensure that so long as a majority set of members do not collude, the confidentiality of the blockchain's state is protected by the mutually trusted code that executes within TEEs. It may also ensure that so long as the network can establish a connection with VNs representing at least M+1 members, it can operate, thus ensuring resiliency even in the case when a member withdraws its VNs or its VNs are partitioned from the network.

In some examples, an M of N scheme may be implemented as follows. Each member listed in the blockchain's membership metadata block is represented by the member's public key, as well as a fragment of the BMK encrypted to that public key, as shown in Table 1. In some examples, the first metadata membership block is created during network bootstrap, encrypting the BMK to the initial membership set. When an additional member is added to the network, an example of COCO takes steps to adjust M and N by creating a new BMK, fragmenting it across the updated N set of members, and appending a new metadata block that includes both the previous BMK encrypted by the new BMK, as well as the updated membership list.

TABLE 1

M of N encryption of BMK in persisted blockchain

| $PBK_{m1}$ | $PBK_{m2}$ | $PBK_{m3}$ | BMK | $E_{BMK}$ |
|---|---|---|---|---|
| $E_{KBKm1}(BMK_{m1})$ | $E_{KBKm2}(BMK_{m2})$ | $E_{KBKm3}(BMK_{m3})$ | | (Transactions) |

Just as before, blockchain state up to the point of a membership update may be subject to compromise by a colluding set of the previous membership set according to the blockchain's implementation of M of N. But by creating a new BMK, all blockchain state from that point forward in the blockchain's timeline may be protected by the updated membership set, including an updated M of N scheme, if the blockchain implements one.

To prevent rollback of the blockchain to a previous state, a signature, authentication code, or a unique identifier of the last addition to the chain can be stored in trusted non-volatile storage accessible only to the VNs. Similarly, the signature of the last addition to the blockchain may be included in all interactions with members to allow members to detect any attempts to roll back the blockchain to a previous state. In some examples, members roll over KBKs upon membership changes to protect against bugs in old code versions. In some examples, attestation, key exchange, or both is rerun after every membership version in certain circumstances, such as code version removal from the approval list of code.

In some examples, COCO is adapted to a model that does not require each member to have dedicated VNs. Shared VNs may be useful for development and/or testing, cost-conscious members, or as the basis for a multitenant hosted solution either by a cloud provider or by a member who acts as the hosting agent for other members. In one example, all members rely upon a single VN (or set of VNs for high availability) hosted by a single centralized party. In this example of a centralized model, all members may need to rely upon the centralized party to process transactions and to process membership updates, and unless blockchain state is streamed or exported, the centralized infrastructure may become a single point of failure for blockchain state.

In some examples, to accommodate multi-tenant VNs, the endorsement handler accepts member inputs as above, storing separate endorsement states per member inside the TEEs. In some examples, the endorsement handler only commits changes once quorum has been reached among the members participating in the shared VN.

Unlike traditional blockchain implementations, some examples of COCO VNs trust their peers, enabling highly efficient, scalable and performant transaction processing across VNs.

Several measures may substantially mitigate the risks associated with TEE compromise. The likelihood of TEE compromise can be reduced in several ways. One way of reducing the likelihood of TEE compromise may be accomplished as follows. Each VN is factored into two parts. The manager TEE may be responsible for private key management, cryptographic processing, and membership update logic so that the amount of code required to implement the manager TEE is bounded, and that code need not vary with each blockchain integration. This code can then be formally verified and heavily audited to further minimize the risk of compromise.

In such an example, the manager TEE is essentially a TEE-based hardware security module (HSM) responsible for the most trusted operations of the VN, and the worker TEE is a separate enclave that hosts the blockchain protocol code. (In some examples, the worker TEE may include a significantly larger codebase than the manager TEE, and the codebase of the worker TEE varies with each ledger that is integrated with COCO.) In such an example, the worker TEE makes requests to the manager TEE for encryption, decryption, and signing of data using the VN's private keys such that if the worker TEE is compromised, an attacker could access any plaintext data that is loaded in memory by the worker TEE—but it could not directly access the keys, independently decrypt blocks on disk or propose or approve membership changes. This example of two-TEE factoring reduces the likelihood of manager TEE compromise, and reduces the impact of a worker TEE compromise.

In some examples, the network can also enforce a rule that VN authorization to participate in the network is a lease which must be periodically renewed. The renewal process may require that the TEE is reset to a pristine state, and might eliminate any toehold that an attacker might be able to gain. VNs that do not renew their lease may be quarantined from the network, and thus might prevent exposure of new data added to the blockchain after quarantine takes effect.

The encryption and authentication functions of the KBK may be split apart into two separate keys. This split may eliminate the need for the VNs to replicate the authentication private key. In some examples, only the encryption key needs to be replicated across VNs—which may eliminate global exposure of member authentication private keys upon manager TEE compromise.

VNs may sample transactions sent from other VNs and to fully validate the sample synchronously before commitment. This may ensure that a VN producing bogus results could be detected quickly to drive alerts without a major performance reduction. Similarly, a separate node may asynchronously validate all transactions, also driving alerts if any problems are detected.

Various examples of a blockchain system leverage the properties of TEEs, and may serve as a foundation for blockchain implementations that support database-level transaction throughputs and latencies, as well as flexible confidentiality models. In some examples, many different blockchain protocols can take advantage of examples of the COCO framework to provide efficient transaction processing with blockchain and transaction confidentiality.

Through the specification, examples have been given in which is member has its own VN. However, in some examples, as discussed in greater detail above, multiple members may share the same VN, or even all of the members may share a single node endorsed by all of the members.

Not all examples include all of the features discussed herein. For instance, some examples do not use encryption.

Figure 10:
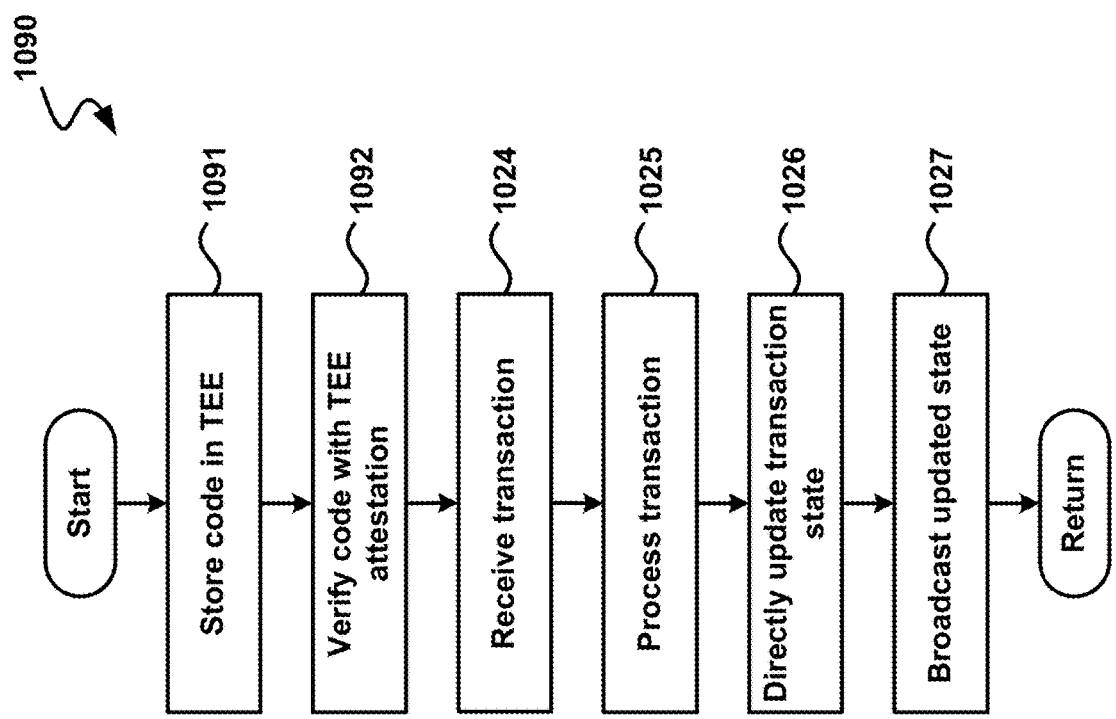
FIG. 10 is a diagram illustrating another example dataflow for a process for transaction processing for a blockchain network, in accordance with aspects of the present disclosure.

FIG. 10 is a diagram illustrating another example dataflow for a process (1090) for establishing a blockchain network. In some examples, the process of FIG. 10 is performed by a validation node. In the illustrated example, step 1091 occurs first. At step 1091, in some examples, a pre-determined type of blockchain protocol code is stored in a trusted execution environment (TEE) of the processor.

As shown, step 1092 occurs next in some examples. At step 1092, in some examples, TEE attestation is used to verify that the blockchain protocol code stored in the TEE is the pre-determined type of blockchain protocol code.

In some examples, the steps at 1091 and 1092 are performed prior to transaction processing. For instance, in some examples, the steps at 1091 and 1092 are performed during establishment of the blockchain consortium network. The step at 1091 and 1092 may also be performed, for example, for a new validation node added to an existing blockchain consortium network, or performed again with different code upon a change to the network in which the type of blockchain protocol to be executed in a TEE is changed. The step at 1092 may be performed again at particular times in some examples. In some examples, the TEE authorization is periodically renewed. For instance, in some examples, as discussed above, VN authorization to participate in the network is a lease which must be periodically renewed, and among other things, the steps at 1091 and/or 1092 may be performed again upon renewal of the lease.

As shown, step 1093 occurs next in some examples. At step 1093, in some examples, a blockchain transaction is received. As shown, step 1094 occurs next in some examples. At step 1094, the blockchain transaction may be processed. As shown, step 1095 occurs next in some examples. At step 1095, in some examples, an official state of the processed blockchain is directly updated based on the processing of the blockchain transaction. As shown, step 1096 occurs next in some examples. At step 1096, the updated official state of the processed blockchain may be broadcast to the blockchain network. The processing then proceeds to a return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus for a blockchain system, comprising:
   a device including at least one memory adapted to store run-time data for the device, and at least one processor that is adapted to execute processor-executable code that, in response to execution, enables the device to perform actions, including:
   storing a pre-determined type of consortium blockchain protocol code in a trusted execution environment (TEE) of the processor;
   using TEE attestation to verify that the consortium blockchain protocol code stored in the TEE is the pre-determined type of consortium blockchain protocol code;
   receiving a blockchain transaction;
   processing the blockchain transaction;
   directly updating, for a consortium blockchain network, an official state of the processed blockchain based on the processing of the blockchain transaction such that the official state of the processed blockchain is updated without requiring confirmation outside of the device; and
   broadcasting the updated official state of the processed blockchain to the consortium blockchain network.

2. The apparatus of claim 1, the actions further comprising:
   using a consensus algorithm to elect a validation node leader, wherein the blockchain transaction is received by the validation node leader.

3. The apparatus of claim 1, the actions further comprising:
   performing conflict resolution based, at least in part, on a consensus algorithm.

4. The apparatus of claim 1, wherein the blockchain transaction is received from a forwarding validation node that forwarded the blockchain transaction based on at least one of a conflict resolution protocol or a consensus protocol, and wherein the forwarding validation node received the transaction from a participant.

5. The apparatus of claim 4, the actions further comprising:
   authorizing the participant, including receiving a public transaction key associated with the participant.

6. A method for a blockchain system, comprising:
   storing a pre-determined type of consortium blockchain protocol code in a trusted execution environment (TEE) of a processor of a device;
   using TEE attestation to verify that the consortium blockchain protocol code stored in the TEE is the pre-determined type of consortium blockchain protocol code;
   receiving a blockchain transaction;
   processing the blockchain transaction;
   using at least the processor to directly update, for a consortium blockchain network, an official state of the processed blockchain based on the processing of the blockchain transaction such that the official state of the processed blockchain is updated without requiring confirmation outside of the device; and
   broadcasting the updated official state of the processed blockchain to the consortium blockchain network.

7. The method of claim 6, further comprising:
   using a consensus algorithm to elect a validation node leader, wherein the blockchain transaction is received by the validation node leader.

8. The method of claim 6, further comprising:
performing conflict resolution based, at least in part, on a consensus algorithm.

9. The method of claim 6, wherein the blockchain transaction is encrypted and confidential such that viewing of the blockchain transaction is limited to authorized parties.

10. The method of claim 6, wherein processing the blockchain transaction includes executing non-deterministic code.

11. The method of claim 6, wherein the TEE includes at least one protected region in the processor.

12. The method of claim 6, wherein the TEE includes two protected regions in the processor.

13. The method of claim 6, wherein the TEE authorization is periodically renewed.

14. The method of claim 6, wherein the blockchain transaction is received from a forwarding validation node that forwarded the blockchain transaction based on at least one of a conflict resolution protocol or a consensus protocol, and wherein the forwarding validation node received the transaction from a participant.

15. The method of claim 14, further comprising:
authorizing the participant, including receiving a public transaction key associated with the participant.

16. A processor-readable storage medium, having stored thereon processor-executable code that, upon execution by at least one processor of a device, enables actions, comprising:
using trusted execution environment (TEE) attestation to verify that security protocol code stored in a TEE of a processor of the at least one processor is a pre-determined type of security protocol code;
processing a transaction for a consortium blockchain network; and
directly updating, for the consortium blockchain network, an official state of the processed transaction based on the processing of the transaction such that the official state of the processed blockchain is updated without requiring confirmation outside of the device.

17. The processor-readable storage medium of claim 16, the processor-executable code enabling, upon execution, further actions, comprising:
using a consensus algorithm to elect a validation node leader, wherein the transaction is received by the validation node leader.

18. The processor-readable storage medium of claim 16, the processor-executable code enabling, upon execution, further actions, comprising:
performing conflict resolution based, at least in part, on a consensus algorithm.

19. The processor-readable storage medium of claim 16, wherein the transaction is received from a forwarding validation node that forwarded the transaction based on at least one of a conflict resolution protocol or a consensus protocol, and wherein the forwarding validation node received the transaction from a participant.

20. The processor-readable storage medium of claim 19, the processor-executable code enabling, upon execution, further actions, comprising:
authorizing the participant, including receiving a public transaction key associated with the participant.

* * * * *